Patented May 20, 1930

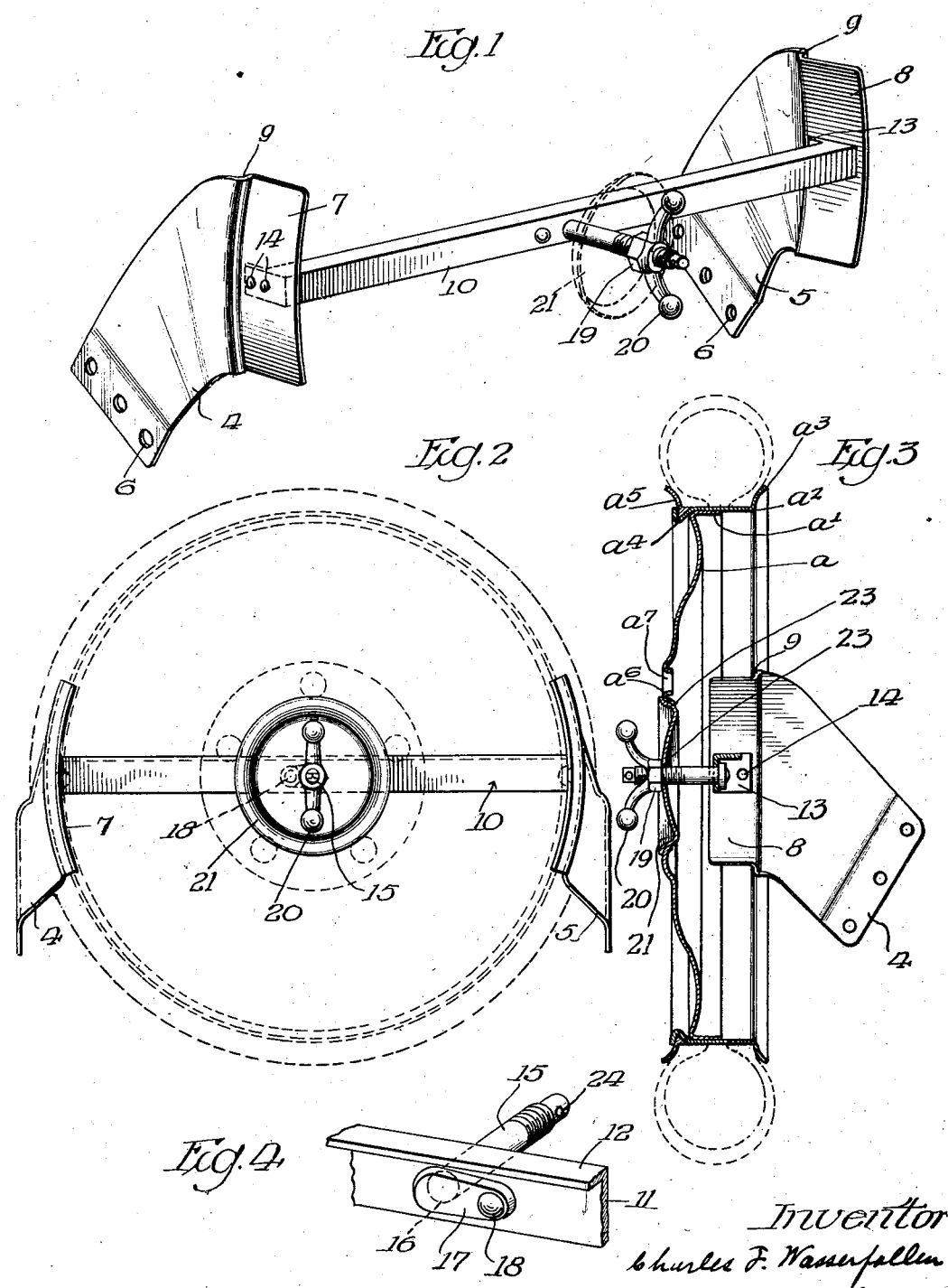

1,759,212

UNITED STATES PATENT OFFICE

CHARLES F. WASSERFALLEN, OF DETROIT, MICHIGAN, ASSIGNOR, BY MESNE ASSIGNMENTS, TO DETROIT AND SECURITY TRUST COMPANY, OF DETROIT, MICHIGAN, A CORPORATION OF MICHIGAN

CARRIER FOR DISK WHEELS

Application filed March 17, 1926. Serial No. 95,171.

The invention relates to carriers for spare tires for use on automobiles, and its object is to provide a carrier whch is more particularly adapted to carry a disk wheel, either with or without a tire thereon, which is simple in construction and can be produced at a low cost, which facilitates placement and removal of the wheel and which efficiently secures the wheel against rattling and squeaking.

The invention consists in the several novel features hereinafter set forth and more particularly defined by the claims at the conclusion hereof.

In the drawing: Fig. 1 is a perspective of a tire carrier embodying the invention. Fig. 2 is a rear elevation. Fig. 3 is a vertical section. Fig. 4 is a perspective of the retaining bolt.

The invention is exemplified in a carrier comprising a pair of brackets 4 and 5 which are preferably formed of stamped metal of suitable thickness. Each of these brackets is provided at its front end with a series of holes 6 for rivets or bolts to fixedly attach it to the rear end of the side sill of a vehicle frame. These brackets terminate at their rear ends in integral arcuate shoes 7 and 8 which conform substantially to, and are adapted to engage, the portions of the inner periphery of a disk wheel to position the wheel concentrically on the carrier. The wheel illustrated comprises a disk $a$, provided with an axially extending flange $a'$, and a rim $a^2$ provided with a tire retaining flange $a^3$ at one side and a groove $a^4$ and a flange $a^5$ at its opposite side to hold a tire-retaining ring, as well understood in the art. The rim is formed with a central circular opening $a^6$, to fit around a portion of the hub on an axle and with an annular series of holes $a^7$ for the wheel attaching bolts carried by said hub. The disk $a$, adjacent the opening $a^6$, is tapered.

Each of the brackets 4 and 5 has an offset 9 which forms a shoulder against which the outer side of flange $a^3$ will abut, and this shoulder is preferably flared to insure a snug fit between the offset and the rim. A cross-bar 10 extends between, and has its ends fixedly secured to the shoes 7 and 8 to rigidly secure them in properly spaced relation. This cross-bar is angular in cross section and comprises a vertical flange 11 and a horizontal flange 12, so that it will be rigid against vertical and transverse stresses. The ends of the cross-bar are provided with axially extending flanges 13 which conform substantially to the inner faces of shoes 7 and 8. Rivets 14 extend through said flanges and the shoes to rigidly secure the cross-bar to the shoes. A retaining bolt 15 has a shank extending through a hole 16 in the vertical flange 11 of the cross-bar and a laterally extending integral lug 17 which abuts against the inner face of said flange and is fixedly secured thereto by a rivet 18. A nut 19 is threaded to said bolt and provided with handles 20 whereby it may be turned. A locking disk or plate 21 has a central hole 22, through which the bolt 15 extends, and is provided with a marginal flared flange 23 which is adapted to fit the tapered margin of hole $a^6$, so that the wheel will be concentrically and truly positioned around the bolt. When the nut 19 is turned to force disk 21 against the wheel, the latter will be jammed against the shoulders 9 on the shoes 7 and 8, and the wheel will be firmly and truly secured on the carrier, so that rattles and squeaks will be avoided. The rear end of the bolt 15 may be provided with a hole 24 to receive a padlock for preventing the unauthorized removal of the wheel from the carrier.

The invention exemplifies a tire carrier in which shouldered shoes for receiving the rim are rigidly cross-connected and secured against contraction and separation by a cross-bar which carries a retaining bolt. This results in a simple and efficient supporting structure by which the wheel will be carried without likelihood of squeaks or rattles. The cross-bar is formed so that it will be rigid against axial and transverse stresses, so that there is no danger of the contracting pressures of the wheel against the shoe distorting the bar. The invention also exemplifies a carrier for disk wheels in which the cross-bar carries a retaining bolt for clamping the wheel on the carrier, so that it is only necessary to remove and tighten the nut 19 in the removal and replacement of the wheel. The carrier as an entity is simple and may be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a carrier for disk wheels, the combination of brackets adapted to be secured to the frame of a vehicle and to extend rearwardly therefrom, an arcuate shoe and shoulders for the wheel and on the brackets, a cross-bar extending between the shoes and having its ends fixed thereto, a bolt extending through the bar and having an offset head riveted to the bar, and means on the bolt for clamping the wheel against the shoulders.

2. A carrier for a disk wheel, comprising in combination a pair of brackets adapted to be secured to the frame of a vehicle so as to project therefrom, each of said brackets embodying means to fit within the wheel-rim and an abutment inwardly of said means for limiting the movement of the wheel axially, a cross bar extending between and having its ends secured to the brackets, an outwardly projecting bolt secured to the said cross bar, a plate mounted on the bolt and provided with a tapered margin to fit into the hub-hole in the disk part of the wheel, and a nut on the bolt for clamping the plate to force and hold the wheel in place.

3. A carrier for a disk wheel, comprising in combination a pair of brackets, each of which is stamped from a one-piece plate of metal and has one end thereof adapted for connection to the frame of a vehicle and its other end bent so as to extend inwardly and then outwardly and to form an arcuate shoe for receiving and supporting the wheel-rim and a shoulder or an abutment between and integral with said one bracket-end and shoe and operable to engage the usual tire retaining flange at the inner side of the wheel-rim in order to limit the wheel against axial movement in one direction while on the carrier, a crossbar extending between and having its ends secured to the brackets, and means for clamping the wheel in place against the shoulders.

4. A carrier for a disk wheel, comprising in combination a pair of brackets, each of which is stamped from a one-piece plate of metal and has one end thereof adapted for connection to the frame of a vehicle and its other end bent so as to extend inwardly and then outwardly and to form an arcuate shoe for receiving and supporting the wheel-rim and a shoulder or an abutment between and integral with said one bracket-end and shoe and operable to engage the usual tire retaining flange at the inner side of the wheel-rim in order to limit the wheel, when on the carrier, against axial movement in one direction, a cross-bar extending between and having its ends fixedly secured to the arcuate shoe, and means carried by said crossbar for clamping the wheel in place against the shoulders.

Signed at Detroit, Michigan, this 12th day of March, 1926.

CHARLES F. WASSERFALLEN.